(12) United States Patent
Byberg et al.

(10) Patent No.: US 8,639,387 B2
(45) Date of Patent: Jan. 28, 2014

(54) METHOD, SYSTEM AND DEVICE FOR CONTROLLING A DEVICE RELATED TO A BUILDING APERTURE

(75) Inventors: Henrik Raun Byberg, Allerod (DK); Ulrik Vagn Ebbe, Greve (DK)

(73) Assignee: VKR Holding A/S (DK)

( * ) Notice: Subject to any disclaimer, the term of this patent is extended or adjusted under 35 U.S.C. 154(b) by 184 days.

(21) Appl. No.: 12/741,162

(22) PCT Filed: Oct. 31, 2008

(86) PCT No.: PCT/DK2008/000388
§ 371 (c)(1),
(2), (4) Date: May 3, 2010

(87) PCT Pub. No.: WO2009/056144
PCT Pub. Date: May 7, 2009

(65) Prior Publication Data
US 2010/0262293 A1    Oct. 14, 2010

(30) Foreign Application Priority Data
Nov. 2, 2007    (DK) .................................. 2007 01562

(51) Int. Cl.
| | |
|---|---|
| *G05B 13/00* | (2006.01) |
| *G05B 15/00* | (2006.01) |
| *G05D 23/00* | (2006.01) |
| *H02P 5/00* | (2006.01) |
| *H02P 7/00* | (2006.01) |
| *H02H 7/08* | (2006.01) |
| *G05D 3/00* | (2006.01) |
| *H02P 1/04* | (2006.01) |
| *G05D 23/185* | (2006.01) |
| *F24F 11/053* | (2006.01) |
| *E06B 9/56* | (2006.01) |
| *E05F 15/20* | (2006.01) |

(52) U.S. Cl.
USPC ........... 700/278; 318/286; 318/446; 318/466; 318/471; 318/484; 318/489; 236/1 C; 236/46 C; 236/91 D; 165/236; 165/237; 165/238; 165/254; 160/5; 160/7; 160/310

(58) Field of Classification Search
USPC ....... 700/275–278; 236/1 R, 1 C, 46 R, 46 C, 236/91 R, 91 D, 91 C; 165/200, 201, 165/236–238, 253, 254; 318/280, 283, 286, 318/445, 446, 466, 468, 471–473, 484, 318/489; 160/1, 7, 10, 238, 309–311, 5
See application file for complete search history.

(56) References Cited

U.S. PATENT DOCUMENTS 5,208,483 A * 5/1993 Reneau ........................ 307/10.1
5,553,661 A    9/1996 Beyerlein et al.
(Continued)

FOREIGN PATENT DOCUMENTS

EP    0771929 A1    5/1997
EP    0844361 A1    5/1998
(Continued)

OTHER PUBLICATIONS

International Search Report issued Jun. 2, 2010; re: PCT/DK2008/000388; citing: WO 2007/030322 A2, US 2005/110416 A1, US 2006/185799 A1, EP 0 771 929 A1 and EP 0 844 361 A1.

*Primary Examiner* — Crystal J Barnes-Bullock
(74) *Attorney, Agent, or Firm* — Cantor Colburn LLP

(57) ABSTRACT

A method of controlling a controllable device related to a building aperture, whereby a climate related characteristic for the aperture is adjusted by the device, and whereby the device is controlled in accordance with a climate and comfort program which is dependent on a control parameter, whereby the device is controlled in accordance with a time schedule provided by the climate and comfort program.

46 Claims, 9 Drawing Sheets

(56) References Cited

U.S. PATENT DOCUMENTS

| | | | |
|---|---|---|---|
| 6,064,949 A | 5/2000 | Werner et al. | |
| 7,045,968 B1* | 5/2006 | Bierman et al. | 315/244 |
| 7,417,397 B2* | 8/2008 | Berman et al. | 318/468 |
| 8,091,604 B2* | 1/2012 | Kluck | 160/1 |
| 8,120,292 B2* | 2/2012 | Berman et al. | 318/280 |
| 8,125,172 B2* | 2/2012 | Berman et al. | 318/480 |
| 8,248,014 B2* | 8/2012 | Berman et al. | 318/466 |
| 8,432,117 B2* | 4/2013 | Berman et al. | 318/445 |
| 8,456,729 B2* | 6/2013 | Brown et al. | 359/275 |
| 8,556,188 B2* | 10/2013 | Steinberg | 236/51 |
| 2003/0098133 A1* | 5/2003 | Palmer | 160/310 |
| 2005/0110416 A1 | 5/2005 | Veskovic | |
| 2006/0161308 A1 | 7/2006 | Wang et al. | |
| 2006/0185799 A1 | 8/2006 | Kates | |
| 2009/0108082 A1* | 4/2009 | Goldmann et al. | 236/49.1 |

FOREIGN PATENT DOCUMENTS

| | | |
|---|---|---|
| WO | 2007006775 A1 | 1/2007 |
| WO | 2007030322 A2 | 3/2007 |

* cited by examiner

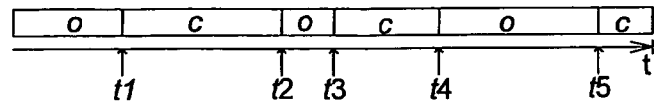
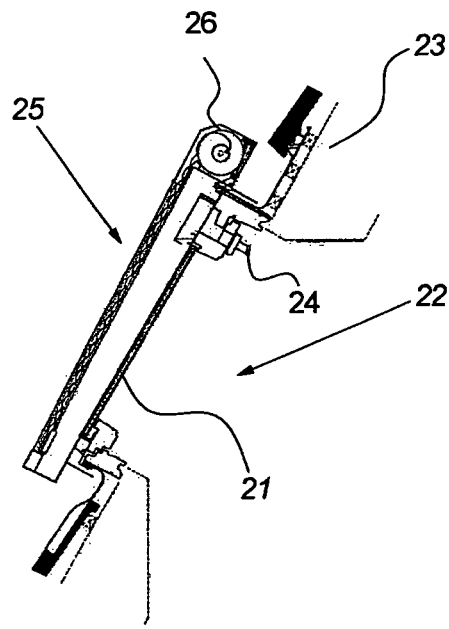
Fig. 6
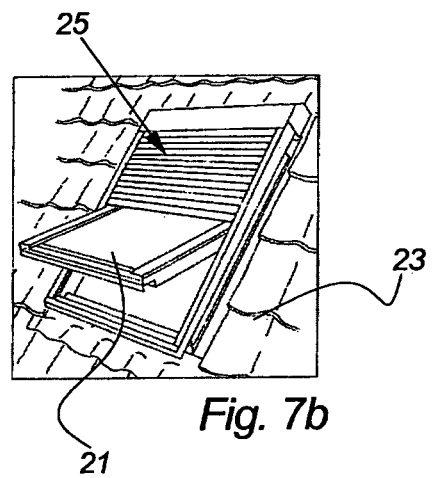
Fig. 7a
Fig. 7b
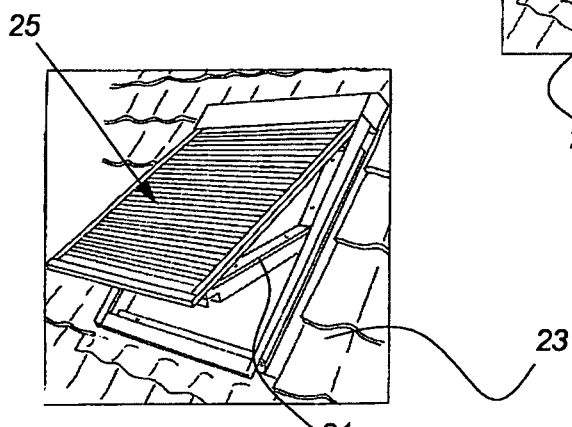
Fig. 7c

METHOD, SYSTEM AND DEVICE FOR CONTROLLING A DEVICE RELATED TO A BUILDING APERTURE

This application is a U.S. National Stage Application of International Application No. PCT/DK2008/000388, filed Oct. 31, 2008, which claims foreign priority to Denmark Application No. PA 2007 01562, filed Nov. 2, 2007.

TECHNICAL FIELD

The invention relates to method of controlling a device related to a building aperture and a control system for performing in accordance with such a method and a device for controlling shading and use of said method.

BACKGROUND

It is known in the art to manually or automatically control screening devices related to windows, e.g. curtains, roller shutters, blinds, sunshades, awnings or the like to avoid the sun to dazzle persons or to overcome that the inside temperature is influenced too much by the outside temperature or by sun heating. The screening device may be manually controlled, typically by means of a person turning a handle or pushing a button on a remote control which activates a motorized actuator related to the screening device. In some relatively new systems, the screening device is self controlling which means that the screening device acts upon receiving input from one or several sensors which e.g. measures light intensity or temperature. The screening device may then e.g. screen the window if the interior temperature gets to high. An example of a system which controls a screening device by means of different sensors is presented in U.S. Pat. No. 6,064,949 which discloses a method of controlling a screening device based on a number of factors, e.g. climate conditions.

Another example of an automatic control of a screening device is disclosed in international patent application WO 2007/006775. Here, a blind is controlled inter alia by determining the weather conditions by means of a photo sensor and by calculating the position of the sun by means of determining a geodetic position with a GPS receiver.

However, several problems may arise in sensor dependent system like the abovementioned. In a system with several sensors situations may occur where two independent sensors may send inconsistent instructions to a screening device. Or one or several sensors may subsequently send opposing instructions to a screening device of which e.g. will result in an unintended and undesirable constant opening and closing of a screening device. If the system has reduced electric power, e.g. battery powered or solar cell powered, then power consumption is high when sensors and controller communicate, e.g. pull or send information. It is desirable to make an automation system for energy optimization which is simple and cost efficient.

BRIEF SUMMARY

The disclosure provides a simple control mechanism more cost efficient for a device related to a building aperture, e.g. a screening device for a window.

Further, a system is provided, which can readily be put into use by a user, e.g. the owner of the house in a user-friendly manner.

Moreover, a system is provided that is able to operate with low power consumption.

Additionally, a method and system are provided by means of providing energy-optimization to buildings, new as well as already existing buildings in a cost efficient manner.

The invention relates to a method of controlling a controllable device related to a building aperture, whereby a climate related characteristic for said aperture is adjusted by said device, and whereby said device is controlled in accordance with a climate and comfort program which is dependent on a control parameter, whereby said device is controlled in accordance with a time schedule provided by said climate and comfort program.

In relation to the strengthened focus on energy consumption, authorities have specified new and tougher energy demands in relation to new building and renovation of existing buildings. This is very relevant in relation to windows which typically are less insulation effective than a wall or roof with housed insulation material.

The invention presents a very advantageous, easy implementable and low cost system and method for minimizing the energy loss which normally is associated with building apertures, especially skylights.

The present invention presents an energy saving application program—a climate and comfort program is introduced, which involves an automatic control of a screening device to obtain the following energy saving initiatives. When the effective temperature is high and when the sun is active, the heat gain is reduced by closing the screening device and thereby save air conditioning energy costs. When the temperature is low, the screening device is closed at night to improve the insulation value. Evidently for interior illumination reasons, the screening device may be partly opened or periodically open to let the exterior light into the building. When the temperature is low and during the daytime the screening device is open to let heat from the sun enter to contribute with heat to save heating costs.

A climate related characteristic is according to an embodiment of the invention understood as any characteristic that may be changed in a building aperture.

Examples of climate related characteristics are settings for the position of a screening device or an actuator to control the screening device, settings for an electronically controlled sun-filter of a window, settings for a venting valve etc.

Thus, the climate related characteristic may be adjusted in accordance with a climate and comfort program in accordance with an embodiment of the invention.

In an embodiment of the invention, said control parameter represents a geographical location.

It is very advantageous that timestamps for opening and closing the screening device, e.g. a roller shutter varies according to the specific position of the shutter since the climate varies considerable in different positions of the earth. The position may be defined according to a geographical or geodetic position.

In an embodiment of the invention, said control parameter represents a direction. For example a direction of a window/roof light related to said controllable device.

The climate and comfort program may advantageously distinguish between the direction of the building apertures, which has a great influence of how the climate and control program functions. The differentiation between the directions of the windows offers an even more optimized energy saving feature in accordance with an embodiment of the invention due to the fact that illumination from the sun is differing very much from different directions. For example the shutters related to windows facing north may be open more than shutters facing west because the sun is more active from the west than from the north again depending on the position of the shutter.

It should be noted that the location may be represented as a direct or relative position.

In an embodiment of the invention, said control parameter is indicated by means of user-input.

It is a very advantageous feature of an embodiment of the invention that the user may input information into the system, after which the system may be operational and ready to run. The system may after this user-input of information, e.g. position, direction and inclination of the window, be able to "calculate" the correct variation of the climate and comfort program.

In a further aspect of the invention, the information to be input by the user, may be utilized indirectly by the control system if a user e.g. inputs the location by means of selecting or inputting the nearest major city, the control system will automatically work out the probability of that the window has a built-in sun filter.

The user-input may be entered into the system by means of using a control unit, e.g. a remote control unit which automatically establishes or updates the climate and comfort program according to the entered information by means of pushing buttons or pushing a touch screen of the control unit.

In an embodiment of the invention, said climate and comfort program may be operating on the basis of at least one parameter, the value of which is dependent on said location.

In an embodiment of the invention, said value is comprised in a table.

In an embodiment of the invention, said climate and comfort program is affected by the inclination of the building aperture.

In an embodiment of the invention, said climate and comfort program is sequentially organized, and wherein the sequence is dependent on different intervals/periods, e.g. weeks, months or seasons.

In an embodiment of the invention, said climate and comfort program operates in dependence of the construction material of the building.

If the climate and comfort program is informed about the construction material of the building, the program may advantageously be affected by this. The construction material information may comprise information such as "wood", "bricks", "concrete thickness", insulation thickness etc.

In an embodiment of the invention, said climate and comfort program operates dependent on a home/out parameter which indicates whether a user is inside the building or not.

In an embodiment of the invention, said home/out parameter is indicated by means of user-input.

That the system differentiates between if the user is at home or out of the house is an advantageous feature of the invention. The home/out determination may replace or be used in combination with other variation of the climate and comfort program. It is very advantageous that the system distinguishes between the user being home or out. When the user is out of the house (e.g. all persons living in the house) the climate and comfort program does not have to take comfort into consideration but only work for the energy optimization. This may e.g. mean that all shutters closes when nobody is home in the house to save energy on air conditioning. There is no need for natural light in the house when there is nobody home.

The user may indicate to the system whether he/she is at home or not, e.g. by pushing a button on the control unit e.g. a remote control.

In an embodiment of the invention, said home/out parameter is determined by means of automatically determining if a user is inside the building or not.

In a further embodiment of the invention it is automatically determined whether the user is in the building or not. This may e.g. be done by means of placing one or several motion sensors in the building.

In an embodiment of the invention, said method of controlling may be overridden by a manual control performed by the user, e.g. by means of using a remote control.

If e.g. a user manually by using the remote control tries to open a shutter of a skylight while the climate and comfort program is running he or she is evidently allowed to do so. The climate and comfort program will go back in action when the next action of the program is executed, e.g. closing a shutter.

In an embodiment of the invention, said control parameter represents a geographical location selected from a list of the nearest place name, e.g. the nearest major city.

In an embodiment of the invention, said control parameter represents the direction of the window/roof light related to said controllable device.

In an embodiment of the invention, said control parameter represents the inclination of a window/sky light related to said controllable device.

In an embodiment of the invention, said device comprises an actuation means which is motor driven and powered by a battery.

In an embodiment of the invention, said device comprises an actuation means which is motor driven and powered by solar energy.

It is very advantageous that the actuation means is powered by solar energy, which contributes to the power saving. Evidently, the actuation means comprised in the device may be motor driven and powered by the mains of the building.

In an embodiment of the invention, said controllable device is a screening device, e.g. a roller shutter or a blind.

In an embodiment of the invention, said controllable device is a venting device such as e.g. a venting valve or window.

A venting device is in accordance with an embodiment of the invention understood as a device which may open an opening between the interior and the exterior. This may e.g. be a venting valve with or without a fan and a possible assembly of equipment for air treatment including a means for ventilation, air circulation, air cleaning, and heat transfer (either heating or cooling). Evidently, the window itself may function as a venting device when opening.

In an embodiment of the invention, said geographical position is determined by use of a GPS (Global positioning system) system.

When using a GPS, the exact position of the building aperture may be determined which may result in a more energy saving application of the climate and control program.

In an embodiment of the invention, said method of controlling may be performed parallel with a manual control by the user while said climate and comfort program is active e.g. by means of using a remote control.

The invention provides a climate and comfort scheme that is compatible with user initiated control commands. The user is able to control for example shades, while a climate and comfort program is running without causing any conflicts and with no need for broadcasting/communication for the whole system. The controller executing the climate and comfort program remains unaffected by manual user commands, even from other controllers/remotes.

In an embodiment of the invention, said method of controlling provides at least two setup configurations, wherein a first configuration method provides indication of a basic control parameter(s) and a second configuration method provides indication of additional control parameters different from said basic control parameter(s).

A quick configuration is desired for less technical users. This may be provided by offering a configuration with few and simple control parameters, while a full configuration may also be provided comprising more control parameters.

In an embodiment of the invention, said method of controlling the device has plural positions including a mainly closed position which permits a smaller amount of sunlight to enter.

A smaller amount of light will serve the purpose of energy optimization while still providing the users the comfort of some sunlight. So for example the shading device can close 90% only and provide sunlight and still help to conserve energy.

Moreover, the invention relates to a control system for controlling a controllable device related to a building aperture, the system comprising data processing means adapted to adjust a climate related characteristic for said aperture, wherein said device is controlled in accordance with a climate and comfort program executed by said data processing means which is dependent on a control parameter and wherein said device is controlled in accordance with a time schedule provided by said climate and comfort program.

In an embodiment of the invention, said control parameter represents a geographical location.

In an embodiment of the invention, said control parameter represents a direction.

In an embodiment of the invention, said control system moreover comprises means for carrying out a user specified configuration of said climate and comfort program.

In an embodiment of the invention, said control parameter is indicated by means of user-input.

It is a very advantageous feature of an embodiment of the invention that the user may input information into the system, after which the system may be operational and ready to run. After this user specified configuration, where the user inputs information into the system such as position, direction and inclination of the window, the system is able to "calculate" or configure the correct variation of the climate and comfort program.

The user-input may be entered into the system by means of using a control unit, e.g. a remote control unit which automatically establishes or updates the climate and comfort program according to the entered information by means of pushing buttons or pushing a touch screen of the control unit.

In an embodiment of the invention, said climate and comfort program is affected by the inclination of the building aperture.

In an embodiment of the invention, said climate and comfort program operates differently according to different time intervals/periods, e.g. weeks, months or seasons.

In an embodiment of the invention, said climate and comfort program operates dependent on a home/out parameter which indicates whether a user is inside the building or not.

In an embodiment of the invention, said home/out parameter is indicated by means of user-input.

In an embodiment of the invention, said system comprises means for automatically determining if a user is inside the building or not.

In an embodiment of the invention, said control parameter represents the direction of the window/roof light related to said controllable device.

In an embodiment of the invention, said control system moreover comprises an actuation means which is motor driven and powered by a battery.

In an embodiment of the invention, said control system moreover comprises an actuation means which is motor driven and powered by solar energy.

In an embodiment of the invention, said controllable device is a screening device, a roller shutter or a blind. In an embodiment of the invention, said controllable device is a venting mechanism, a window or venting valve.

In an embodiment of the invention, said system furthermore comprises a GPS system for automatically determining a geographical position.

In an embodiment of the invention, said control system may be used parallel with a manual control by the user while said climate and comfort program is active e.g. by means of using a remote control.

In an embodiment of the invention, said control system provides at least two setup configurations, wherein a first configuration provides indication of a basic control parameter(s) and a second configuration provides indication of additional control parameters different from said basic control parameter(s).

In an embodiment of the invention, said control system is provided, wherein the device has plural positions including a mainly closed position which permits a smaller amount of sunlight to enter.

Moreover, the invention relates to a device for shading an opening related to a building aperture, comprising:
a climate and comfort controller configured to:
control open and close of shading means and operate by a time schedule to adjust a climate related characteristic, said climate and comfort controller is dependent on at least one control parameter.

In an embodiment of the invention, said control parameter represents a geographical location.

In an embodiment of the invention, said there is provided a control parameter that represents a direction of a window/roof light related to said device.

In an embodiment of the invention, said control parameter is indicated by means of user-input.

In an embodiment of the invention, said control parameter moreover comprises means for carrying out a user specified configuration of said climate and comfort program.

In an embodiment of the invention, said climate and comfort controller is sequentially organized, and wherein the sequence is dependent on different intervals/periods, e.g. weeks, months or seasons.

In an embodiment of the invention, said climate and comfort controller operates dependent on a home/out parameter which indicates whether a user is inside the building or not.

In an embodiment of the invention, said control parameter represents a geographical location selected from a list of the nearest place name, e.g. the nearest major city.

In an embodiment of the invention, said open and close control may be performed parallel with a manual control by the user while said climate and comfort controller is active e.g. by means of using a remote control.

In an embodiment of the invention, said device has drive means and accumulator means, e.g. a roller shutter, or a blind.

In an embodiment of the invention, at least two setup configurations are provided, wherein a first configuration provides indication of a basic control parameter(s) and a second configuration provides indication of additional control parameters different from said basic control parameter(s).

In an embodiment of the invention, the device and/or controller has plural positions including a mainly closed position which permits a smaller amount of sunlight to enter.

Furthermore, the invention relates to a system comprising a controllable device related to a building aperture, and a control system.

BRIEF DESCRIPTION OF THE DRAWINGS

The invention will be explained in further detail below with reference to the figures of which

FIG. 7a illustrates a roof light/window as seen in cross section,

FIG. 7b illustrates the roller shutter screening device mounted on a roof light as seen in a perspective view, FIG. 7c illustrates a perspective view of a roof light wherein the roller shutter screening device is closed.

DETAILED DESCRIPTION

Figure 1:
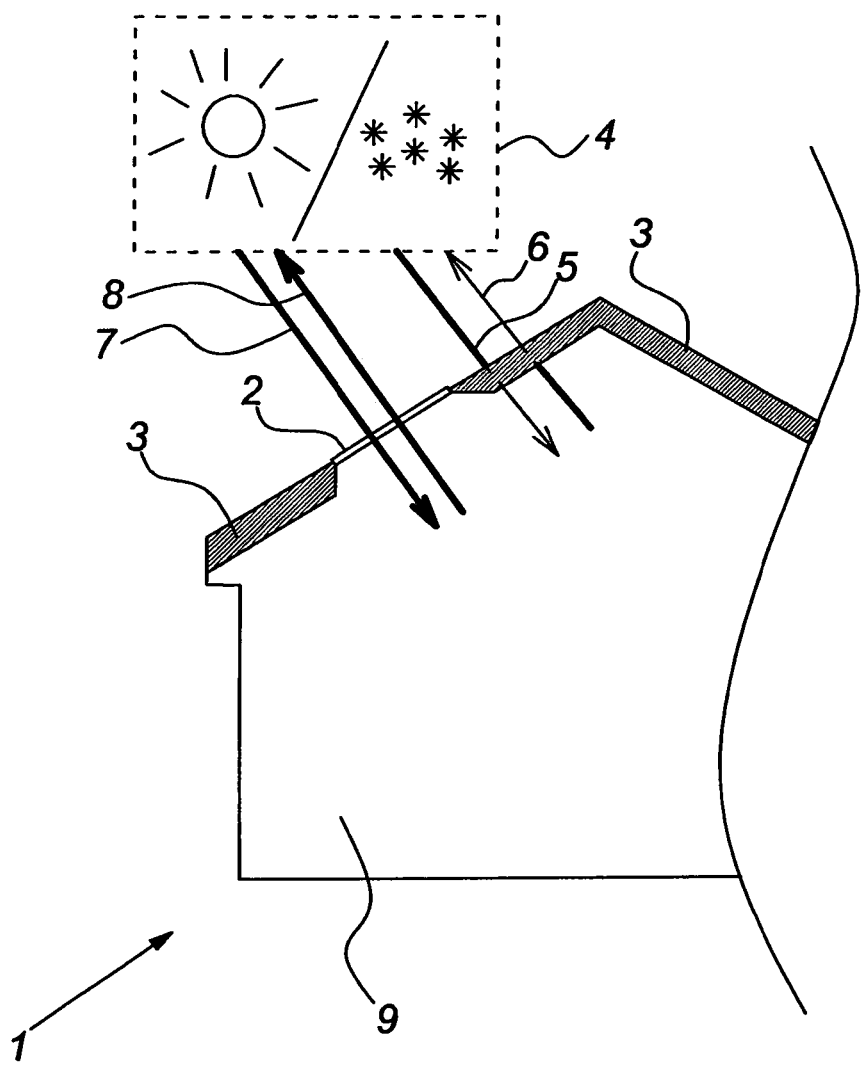
FIG. 1 illustrates the principles of exterior weather conditions affecting the interior climate of a building.

FIG. 1 illustrates the principles of the exterior climate/weather conditions affecting the interior climate of a building.

The figure illustrates a building 1, which is affected by the exterior weather conditions as explained in the following. Insulation material 3 is located under the building roof and in relation to the exterior walls (not shown). The building has a roof window 2. Roof windows can allow double amount of light/energy to enter compared to regular vertical windows. The interior 9 of the building may be affected by the exterior climate conditions 4. The exterior climate 4 may vary from low temperatures to high temperatures. This variation will typically be dependent on the season, e.g. low temperatures in the winter season and high in the summer season. Furthermore, the geographic position of the building may affect the climate conditions in that some countries have generally low temperatures while others generally have high temperatures. Moreover, the stability of the climate conditions may also vary very much according to the geographical position.

As illustrated by the arrows 5, 6 heat may flow both from the outside to the inside 9 of the building and vice versa by heat conduction. The difference in the width of the arrows illustrates that the insulation material 3 is reducing the heat flow between the inside and the outside of the building. As illustrated by the arrows 7,8 the roof window 2 is less insulating/transparent and therefore allows heat to enter more significantly than the insulated roof. Therefore, different screening devices exist both for the purpose of avoiding or even obtaining too much heat flow between the interior and the exterior and vice versa.

Heat may be moved from one side of a window glass to another by means of radiation. Radiant-heat loss through windows can be greatly reduced by placing low-E coatings, e.g. a sun filter on glass that reflects specific wavelengths of energy. Heat may also be moved as light e.g. visible and invisible wavelengths of sunlight, which is input to the building through windows.

Thus, an energy saving application program—a climate and comfort program is according to the present invention introduced, which involves an automatic control of a screening device to obtain the following energy saving initiatives. Heat loss and solar gain may be controlled to improve the energy consumption/balance. When the effective temperature is high and when the sun is active, the heat gain is reduced by closing the screening device and thereby save air conditioning energy costs. When the temperature is low, the screening device is closed at night to improve the insulation value. Evidently for interior illumination reasons, the screening device may be partly opened or periodically open to let the exterior light into the building.

When the temperature is low and during the daytime the screening device is open to let solar heat gain to enter and contribute with heat to save heating costs.

Therefore, if a screening device related to a building aperture, e.g. a skylight also referred to as roof light, is correctly controlled, the roof light may be energy neutral or may even contribute with energy, compared to a roof without skylights. In accordance with an alternative embodiment of the invention the building aperture may be a vertical window or door.

The present invention presents a method for controlling a device related to a building aperture, e.g. screening device to obtain energy reducing/contributing or energy neutral effect on the building interior on the basis of a predefined set of factors. Another example of a device to be controlled in accordance with the present invention may be a drive means for controlling ventilation in relation to the building aperture, e.g. a drive means for opening and closing the a window or for opening and closing a venting valve or the like.

The control means of the invention may be provided in the form of any software or hardware implemented execution means, e.g. a chip, a PLC (PLC: programmable logic controller) combined with a mechanical actuator means for controlling the device in question. According to a preferred embodiment of the invention, the control logic for controlling the device related to a building aperture is implemented in relation to a remote control unit of the system as illustrated with reference in FIG. 8.

FIGS. 2a-b, 3a-d, 4a-d and 5a-d illustrate different examples of a timeline indicating the events of a climate and comfort program structure of one day, i.e. 24 hours beginning from 12.00 am in the left and ending at 11.59 pm at the right, (corresponding to 0.00 and 23.59). The timelines are described on the basis controlling, opening and closing a screening device for a roof light in a house to control the interior climate of a house. The examples described with reference to FIG. 2a-b, 3a-d, 4a-d and 5a-d are based on a typical family house wherein the people living in the house typically are out of the house in the daytime at working days while they are typically at home in the weekends. However, it should be noted that many devices related to building apertures may be controlled in the same manner within the scope of the invention, e.g. control of a shutter, curtain, awning, sunshade, roller blind or Venetian blind related to a window or door, control of the window itself, control of a venting valve in a building etc.

Figure 2A:
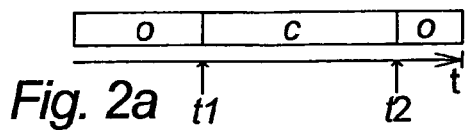
FIG. 2a-b illustrate different examples of a timeline indicating the events of an climate and comfort program structure of one day.
Figure 2B:
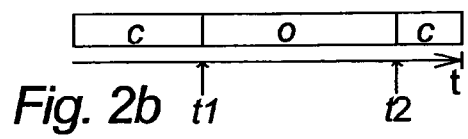

FIG. 2a illustrates an example of a timeline according to a possible basic setup of a climate and comfort program according to an embodiment of the invention. The timeline indicates the events of the climate and comfort program, i.e. the events of the screening device, i.e. roller shutter in this example to open as indicated with an "o" or close as indicated with a "c" partially or fully. The illustrated timeline indicates an example of the events to occur in a day during the summer months. The figure indicates that the shutter is open from 12.00 am and until a time 8.00 am as indicated with the time set point t1 where the shutter closes. At timestamp t2 at 8.00 pm, the shutter reopens. The events as illustrated in this example ensure that the interior temperature rise is minimized which entails energy savings for air conditioning and ventilation and provides better comfort. The screening device is regulated by means of closing the shutter during most of the sunny hours of a day according to the climate and comfort program. The timeline illustrated in FIG. 2b illustrates the corresponding events of a day during the winter months. Here, the shutter is closed from 8.00 pm t2 to 8.00 am t1 and is correspondingly open between 8.00 am t1 and 8.00 pm t2. This pattern ensures that the sunlight contributes to the required heating of the interior temperature during the winter months and at the same time shuts when the sun is not up to constitute an insulating element to minimize the heat loss. The winter-specific timeline pattern as illustrated in FIG. 2b also contributes to the energy savings of the present invention in that the heating resources are minimized at night due to the minimized heat flow e.g. in the winter season. Thus, the method of controlling the roller shutter related to a roof light according to an embodiment of the invention is an automatically controlled energy saving device that functions independently of sensors.

It is advantageous that the timestamps for opening and closing the screening device, e.g. a roller shutter varies according to the specific position of the shutter since the climate and sun varies considerable in different positions of the earth. The position may be defined according to a geographical or geodetic position. The position may be defined manually and entered by means of e.g. the user entering the coordinates (the degree of longitude and the degree of latitude). From the latitude it is for example possible to derive sun related climate data. Preferably, the user selects the nearest major city on a list (e.g. Berlin, Copenhagen, Hamburg, Helsinki, Paris . . . ), whereby the system automatically determines the properties. Even though the actual position of the building may differ from the position of the entered major city, the climate values for the two positions will be similar. Entering a city is more user friendly way of determining the position, due to the fact that most people do not know the relevant degree of longitude and latitude, but all knows the name of a major city nearby.

When a position of the roof light or building wherein it is mounted is entered into the system, the correct timestamps for opening and closing the screening device, e.g. the roller shutter may be determined by the system. The system may be preinstalled with a table comprising all major cities and the corresponding values. The system may then determine the position from the table upon receiving the input of a nearby major city from a user. An example of the use of table in the system in described in more detail with reference to FIG. 11.

The user may enter the abovementioned information into the system by means of a remote control unit (see FIG. 8) which automatically establishes or updates the climate and comfort program according to the entered information. In an embodiment of the invention the nearest major city is entered as earlier described.

The closed state as indicated by "c" in the figure may indicate both that the screening device is completely or partly closed. In an embodiment of the invention the closed state c at in the summer season (2a) indicates that the screening device is only closed partly e.g. 80%, 85% or 95% closed. This state leaves an open gap to let a small amount of sunlight enter the building. The device may have a closed state where it is mainly closed and permits a smaller amount of sunlight to enter only. The device can be adjusted between 0-100% and comprise a closed state that is mainly closed and permits a smaller amount of sunlight to enter only. The device can be adjusted between 0-100% and comprise a closed state that is 70-95% closed e.g. to permit a smaller amount of sunlight to enter. The device has plural positions including a mainly closed position which permits a smaller amount of sunlight to enter. This is to optimize the indoor climate/comfort level providing a natural indoor illumination which to some people is a very important psychological factor in relation to the general well-being. If the screening device is almost fully closed, e.g. 95%, the illumination from the roof light may be sufficient for persons to orientate in the house and to avoid a complete black out of the house.

Figure 3A:
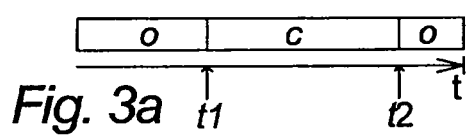
FIG. 3a-d, illustrate different examples of a timeline corresponding to FIG. 2a-b FIG. 4a-d, illustrate different examples of a timeline corresponding to FIG. 2a-b FIG. 5a-d, illustrate different examples of a timeline corresponding to FIG. 2a-b FIG. 6 illustrate an example of a timeline transition.
Figure 3B:
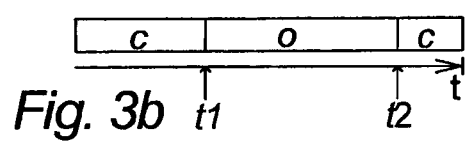
Figure 3C:
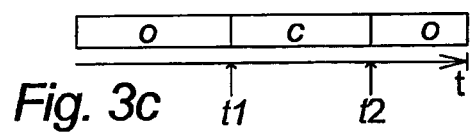
Figure 3D:
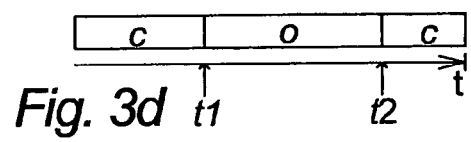

The FIGS. 3a-3d illustrate other examples of a timeline according to a possible setup of a climate and comfort program according to an embodiment of the invention. The illustrated timelines are possible setups of the climate and comfort program in which the timestamps for opening and closing the screening device vary between the working days in FIG. 3a+3b (Monday-Friday) and the weekend days in FIG. 3c+3d (Saturday and Sunday). FIG. 3a illustrates an example of a timeline according to a possible basic setup of a climate and comfort program according to an embodiment of the invention where the shutter is open from 12.00 am and until a time 8.00 am as indicated with the time set point t1 where the shutter closes. At timestamp t2 at 8.00 pm, the shutter reopens. The figure illustrates a timeline illustrating the events to be performed by the climate and comfort program in a day during the working days in the summer months. In the weekends the climate and comfort program switches to the timeline indicated in FIG. 3c wherein the time set points are relocated to limit the time where the shutter is closed. The timestamp t1 for closing the shutter is delayed until 10.00 am and the timestamp t2 for reopening the shutter is displaced so it opens already at 6.00 pm. This ensures that the building interior is more illuminated when there are people in the house which is typically the case in the weekends. Correspondingly in the winter season, the climate and comfort program switches between one setup in the working days as illustrated in FIG. 3b and another which lets more light enter into the house in the weekends as illustrated in FIG. 3d. The increased amount of light in the house optimizes the indoor climate/comfort level providing a natural indoor illumination which to some people is a very important psychological factor in relation to the general well-being.

Evidently, the increased amount of light in the above mentioned examples results in a minor ineffectiveness regarding the above described saving of energy, but in the present example, it is a compromise between energy saving and at the same time getting a natural indoor illumination. Thus, the approach according to FIG. 3a-3d provides both a saving of energy and at the same time brings a certain amount of light and joy into the house. As described with reference to FIG. 2a-2d the time set points is dependent of the position of the window or screening device which may be defined manually entered by means of e.g. the user entering the coordinates FIGS. 4a-4d illustrate another example of a possible setup of a climate and comfort program according to a further embodiment of the invention. This example has the variation between the working days weekend days as in the example described with reference to FIG. 3a-3d and introduces a differentiation between the direction of the window or roof light. Thus, the climate and comfort program provides different timelines for different directions of the windows e.g. the general direction in which the face of the window points according to an embodiment of the invention. The shading devices can be configured into 4 groups e.g. north, east, west and south. This configuration into groups has the advantage that the screening devices on the substantially same side of the building move/open/close synchronized. When the user configures the climate and comfort program, the user can configure the screening devices by selecting on a list of screening devices the devices facing towards the north. Then select on the list of screening devices the screening devices facing towards east. And so on to configure all screening devices into the 4 groups e.g. north, east, west and south.

The differentiation between the directions of the windows offers an even more optimized energy saving feature in accordance with an embodiment of the invention due to the fact that illumination from the sun is differing very much from different directions. For example the shutters related to windows facing north may be open more than shutters facing west because the sun is more active from the west than from the north again depending on the position of the shutter.

Figure 4A:
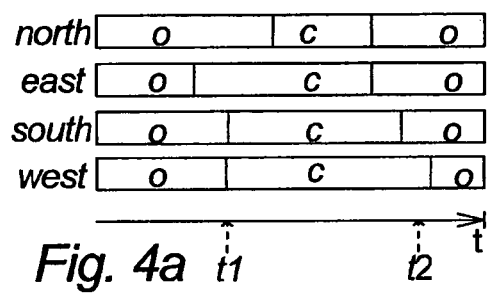

FIG. 4a illustrates four different timelines illustrating the events to be performed by the climate and comfort program in a day during the working days in the summer months. As indicated, the climate and comfort program controls different shutters individually according to different directions, north, east, south and west respectively. As illustrated in the timeline for north the shutter is open from 12.00 am and until a time 10.00 am as indicated with the time set point t1 where the shutter closes. At timestamp t2 at 4.00 pm, the shutter reopens. In the timeline for east the shutter is open from 12.00 am and until a time 6.00 am as indicated with the time set point t1 where the shutter closes. At timestamp t2 at 4.00 pm, the shutter reopens.

As illustrated, the time set point differentiates between the four different directions to make an even more optimized energy saving mechanism according to an embodiment of the invention. FIG. 4c illustrates timelines of the climate and comfort program in the in the summer season in the weekends, where more light is let into the house.

Figure 4B:
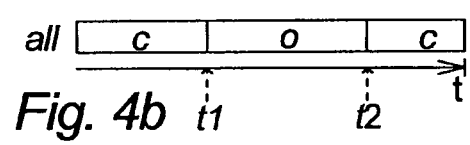
Figure 4C:
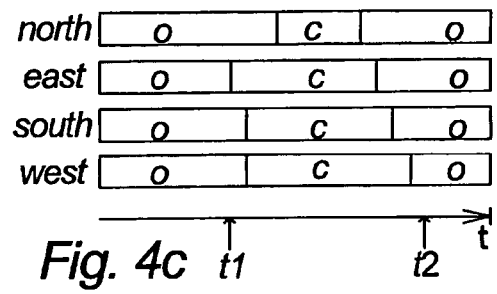
Figure 4D:
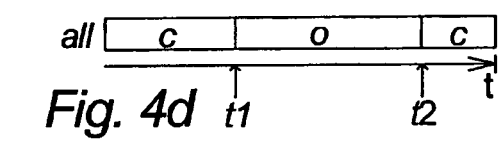

FIGS. 4b and 4d illustrate the timelines of the winter season according to an embodiment of the invention. In the example there is no difference between the directions of the windows in the winter season but in accordance with another embodiment of the invention, this could evidently be the case.

The direction may be defined by a manual entry to be entered by means of e.g. the user entering direction information into the system. This may be by means of manually entering the direction of each window into a remote control unit or another control interface of the system.

FIGS. 5a-5d illustrate other examples of a possible setup of a climate and comfort program according to a still further embodiment of the invention. This example is an extended version of the climate and comfort program as described with reference to FIGS. 4a-4d which additionally provides a control of a venting mechanism, e.g. a venting valve related to the window. Moreover, this example introduces a differentiation between if the user is at home or out of the house. The home/out determination may replace or be used in combination with the differentiation between working days and weekends.

Figure 5A:
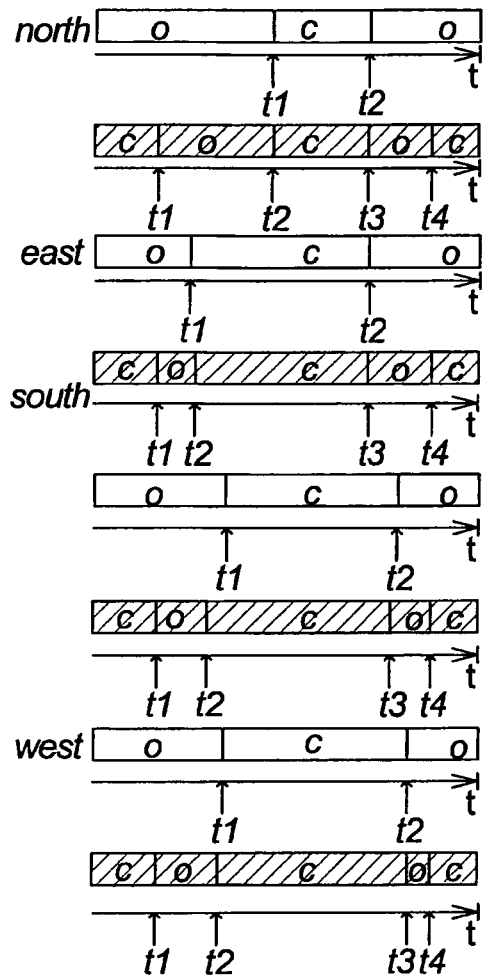
Figure 5C:
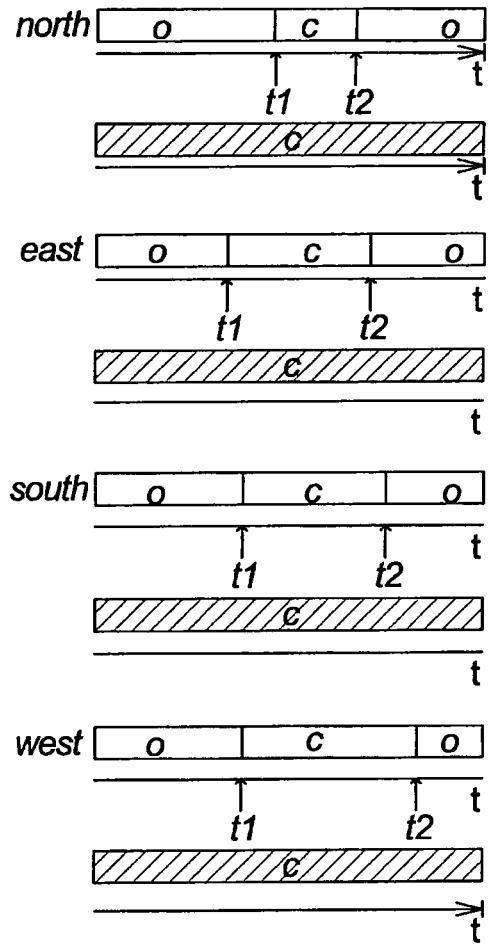

In FIGS. 5a and 5c the climate and comfort program for the summer season is illustrated which is applicable when there is people home in the house. The boxes with the white background illustrate the timelines for screening devices for the directions north, east, south and west respectively, corresponding to the above description of the FIGS. 4a-4d. The boxes with the dashed background illustrate timelines for a possible ventilation mechanism e.g. a venting valve to be opened and closed. Evidently, the venting valve may be completely or only partly opened. The venting valves have according to this specific embodiment of the invention a time period in the morning and in the afternoon as illustrated when they are open. This is determined by means of 4 time set points t1, t2, t3 and t4. These time periods are different according to the relative directions of the window in case. Evidently, more or less time set points for opening or closing venting valves may be implemented according to different embodiments of the invention.

The information of whether a user is home or out of the house may e.g. be determined by means of the user pressing a "home/out" button of e.g. the remote control unit.

Figure 5B:
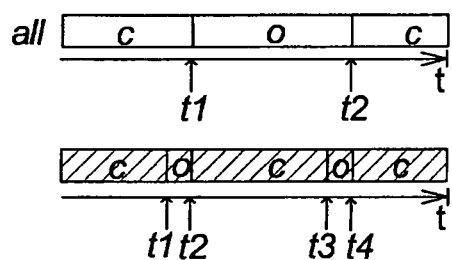
Figure 5D:
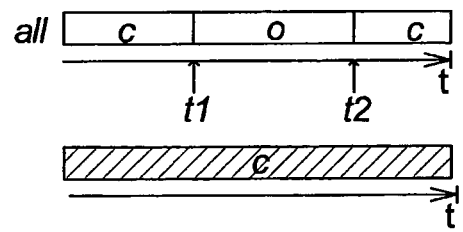

FIGS. 5b and 5d illustrates the timelines while the user is at home in the winter season. The timeline with the dashed background illustrates that the venting valve is open for a short period between e.g. 7.00 am and 8.00 am. Ventilation in a short period of time allows high-moisture air in the room to be changed with low-moisture air from the outside, but at the same time avoids considerable cooling of the walls, furniture etc. and thereby avoiding a increased use of heating energy for reheating.

FIG. 6 illustrates an example of a timeline of the climate and comfort program according to a still further embodiment of the invention. The figure illustrates how the program is capable of automatically changing from one variation of the climate and comfort program to another. In this example the timeline illustrates the shift between a timeline for the summer season to the winter season.

The timeline illustrates that a screening device is open from 12.00 am and until 8.00 am (t1) where it closes until it opens again at 8.00 pm (t2) as in the normal summer season timeline as illustrated with reference to FIG. 3a. At 12 pm (t3) the shutter closes because the climate and comfort program has changed to the winter season configuration wherein the shutter is closed in the night to have an insulating effect.

The next day, e.g. at 8.00 am (t4) the shutter opens. At 8.00 pm, the shutter closes again.

It should be noted that the timelines indicated with reference to FIGS. 2a-6 only exemplifies a differentiation between the two season's summer and winter, but evidently, a differentiation between more time intervals, e.g. four seasons, months or weeks or even days.

The shift from summer timing to winter timing is difficult to define exactly. An intermediary period of 1-5 weeks may be provided in spring and fall, where the climate and comfort program is inactive.

It is possible for a user to manually choose the setting of the climate and comfort program for example in accordance with the above described examples in the FIGS. 2a-6 of the climate and comfort program. Evidently, the user may still override the climate and comfort program by means of manually opening or closing e.g. screening devices or venting valves. Possibly, other automated systems may exist in relation to the same window or screening device as the climate and comfort program controls, but evidently this is taken into account by means of a built-in priority handler within the system. If, for example, it is determined that a window must close because of precipitation indicated by a rain-sensor, then the climate and comfort program cannot open the window if such an action is destined to take place as part of the climate and comfort program.

In accordance with an embodiment of the invention, the climate and comfort program may be combined with conventional use of different sensors or detecting elements in relation to control of e.g. screening devices.

The above described examples of timelines according to different embodiments of the invention, with reference in the FIGS. 2a-6, are only understood as examples of different settings of the climate and comfort program. Thus, any combinations of the described details of the different climate and comfort programs are considered within the scope of the invention. The time points are merely to be understood as examples of concrete embodiments of the invention.

The climate and comfort programs as previously defined and described are evidently dependent of an internal clock in the system. The clock may be manually set e.g. be controlled via an external source e.g. via radio waves i.e. a radio controlled clock.

As described in relation to the above description, many factors are important when it comes to determining the correct time set points for opening and closing screening devices. Factors like the geographic position, the direction, whether the user is out or home, the slope of the roof etc. may be utilized by the climate and comfort program to determine the best and most sensible time set points for opening and closing devices such as screening devices or venting valves.

FIGS. 7a, 7b, 7c illustrate a skylight/window with a roller shutter to be automatically controlled by means of the climate and comfort program according to an embodiment of the invention.

FIG. 7a illustrates a roof light/window 21 as seen in cross section. The roof light 21 is mounted in relation to a building aperture 22 of building roof 23. The window may be opened and closed by means of an opening mechanism 24. A roller shutter 25 is mounted on the window 21 which may be manually or electrically controlled. The roller shutter may be raised to open the shutter and may be rolled about a rotating roller 26 which is mounted above the top end of the window. The roller shutter has drive means e.g. a motor which drives the shutter to open and close it.

FIG. 7b illustrates the roller shutter 25 mounted on a roof light 21 as seen in a perspective view. The roof light is mounted on the roof 23 of a building. In this figure, the roller shutter 25 is partly open. FIG. 7c illustrates a perspective view of a roof light wherein the roller shutter 25 is closed. The roller shutter is an example of an exterior screening device which may be controlled in accordance with the present invention. Further, FIG. 7c illustrate that venting, e.g. opening and closing of the window, may take place irrespectively of the position of the shutter.

Figure 7D:
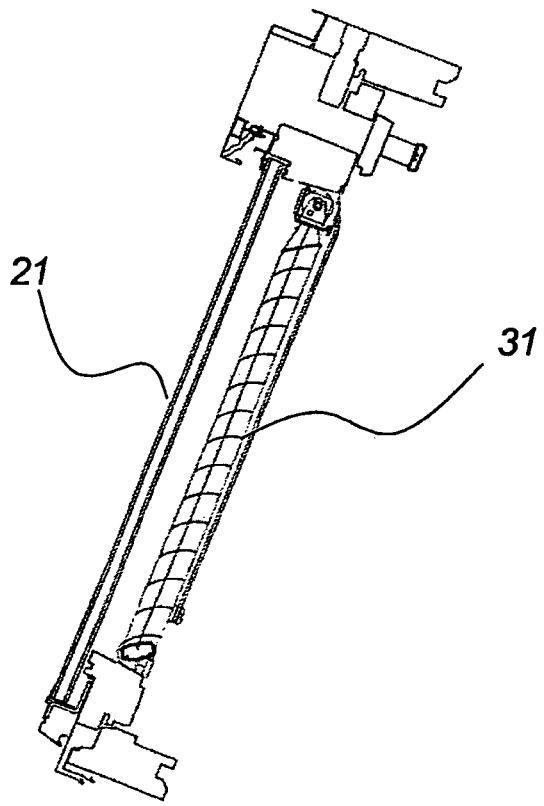
FIG. 7d illustrates another example of an interior screening device related to a window.

FIG. 7d illustrates another example of a screening device related to a window (roof light) 21. The figure illustrates a Venetian blind 31 which is mounted in the roof light 21. A Venetian blind is a window blind made of horizontal strips that overlap when the blind is closed. The Venetian blind is an example of an interior screening device which may be controlled in accordance with the present invention. The climate and comfort program may in accordance with an embodiment of the invention control the Venetian blind 31 in such a manner that the horizontal strips may be controlled/turned or so the Venetian blind may be driven upwards or downwards (opened or closed). The Venetian shade may also be on the outside of the window 21. For example a roller shutter with tilting horizontal strips/flaps, which can provide a benefit, in that the shading device can be partially open/closed and provide both climate and comfort benefits.

Figure 7E:
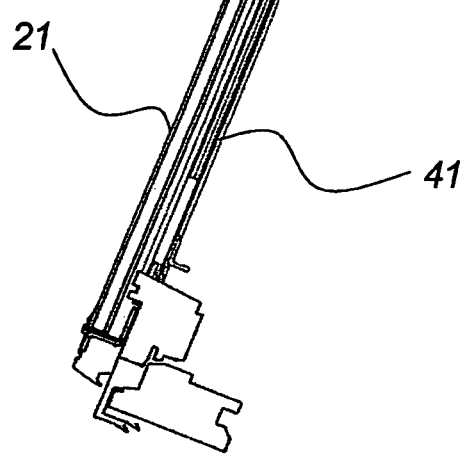
FIG. 7e illustrates a still further example of an interior screening device which may be controlled in accordance with the present invention.

FIG. 7e illustrates another example of an interior screening device which may be controlled in accordance with the present invention. The figure illustrates a roof light 21 with a roller shade 41 which may be rolled around a rotating roller 42. The rotating roller may have a motor drive means 42 which can roll the shade up or down. The climate and comfort program may in accordance with an embodiment of the invention control the roller shade 41.

Figure 8:
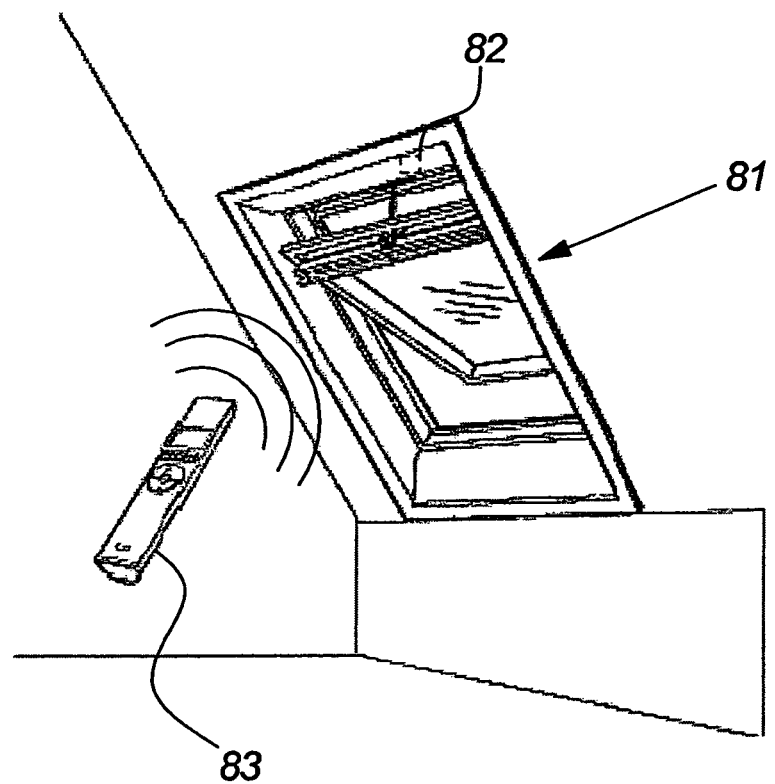
FIG. 8 illustrates a window and a corresponding remote control unit as utilized according to an embodiment of the invention.

FIG. 8 illustrates a window and a corresponding remote control unit according to an embodiment of the invention. The figure illustrates a roof light 81 which on the outside has a roller shutter which functions as a screening device (not shown). The window is controlled by means of an actuation means 82 which may actuate (open and close) the window. The actuation means may be a motor drive which is powered by e.g. mains power from the electrical supply system of the building, battery power, solar power etc. The actuation means may be remote controlled by a user by means of a remote control unit 83.

In accordance with an embodiment of the invention, when the climate and comfort program is executed, the remote control unit 83 transmits control signals to an actuator related to the screening device of the roof light 81 which performs actions according to the control signal. The transmitting of the control signal is performed only when needed, e.g. when an instruction of opening a shutter must be sent. This way of controlling the actuator ensures a centralized and easy control of all actuator devices in e.g. a house and simplifies possible reprogramming or program update implementations which only need to be done one central place.

When a climate and comfort program is installed in the remote control unit 83 the remote control unit will automatically transmit signals to the actuation means and thereby control the roller shutter according to the climate and comfort program in question. Evidently, it is possible for a user to perform a control of a screening device independently of the climate and comfort program. If a user for example during the day opens a shading device (by a user initiated manual command), this will not affect the climate and comfort program, as the shading device according to the climate and comfort program later on the day simply receives another open command and since the screening device in question already has been opened it will ignore said command. This allow the system to comprise several remotes/controllers without the need for a central controller. The next day said shading device will respond according to said climate and comfort program as usually. So manual user initiated commands may control screening devices run by said climate and comfort program and the system will not conflict. This provides the method of controlling to be performed in parallel with a manual control by the user while said climate and comfort program is running. Consequently a system/method is provided that does not require a central controller that polls/monitors the status of all devices and requires much battery power for communication.

Figure 9:
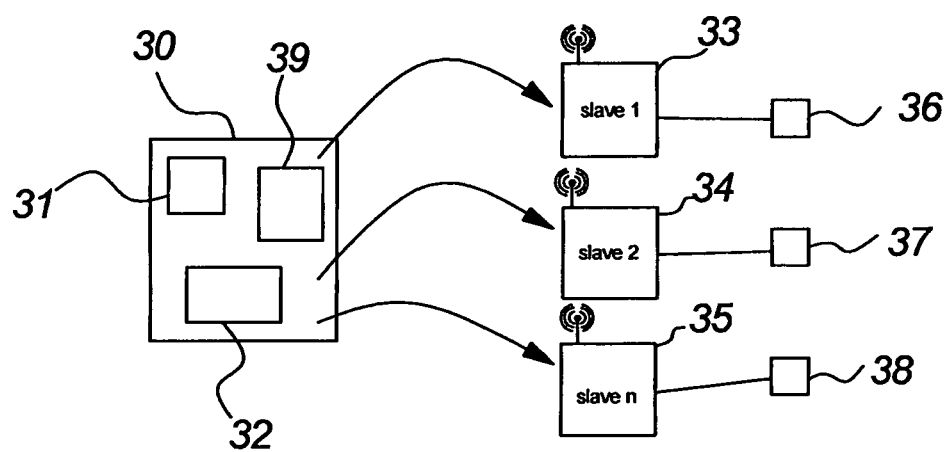
FIG. 9 illustrates a block diagram of the basic elements comprised in a system according to an embodiment of the invention, FIG. 10 Illustrates an example of configuring the climate and comfort program according to a quick setup.

FIG. 9 illustrates a block diagram of the basic elements comprised in a system according to an embodiment of the invention. The control system comprises a control unit 30 which may be a remote control unit. The control unit 30 may comprise a display means 31 and keyboard means 32 which may be for displaying the state of the system and for a user to configure the system as described in more detail with reference to FIG. 11. Moreover, the control unit 30 may comprise a data processing unit 39, in which runs a software program to control the climate and comfort program according to an embodiment of the invention.

The control unit 30 communicates with a number of slaves, in this example three 33, 34, 35. The connection may be wired or be wireless like infrared, but preferably a wireless connection via a radio signal. The slaves 33, 34, 35 are connected to actuators 36,37,38 which may actuate e.g. the screening device in question.

It should be noted, as illustrated, that the control unit 31 may control different slaves 33,34,35 simultaneously.

Figure 10:
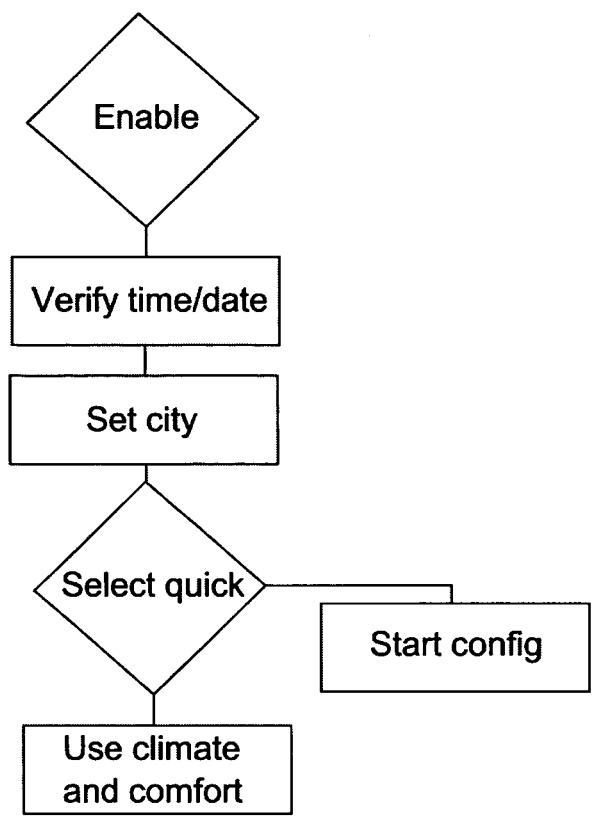

FIG. 10 illustrates example of how a quick setup may be performed according to an embodiment of the invention. The climate and comfort program requires a number of information. To reduce the setup burden for some users, the configuration may comprise different configuration levels. The user can then decide how much time the user wants to spend on configuring the climate and comfort program. When the user chooses to enable the climate and comfort program for the first time the user is asked to enter or verify the date and time. The user may also choose a nearby major city on a list. After supplying this minimal information the user can for example choose to quickly use the climate and comfort program, without spending more time on configuration. Or the user may choose to run a more detailed config and enter more information (for example according to FIG. 11 or 12) and achieve a better performance and/or comfort. The selection of quick config may be performed before or after the setup of date, time and city. The quick configuration of course provides more simple and less optimal control, but still provides benefits compared to not running climate and comfort program at all.

Figure 11:
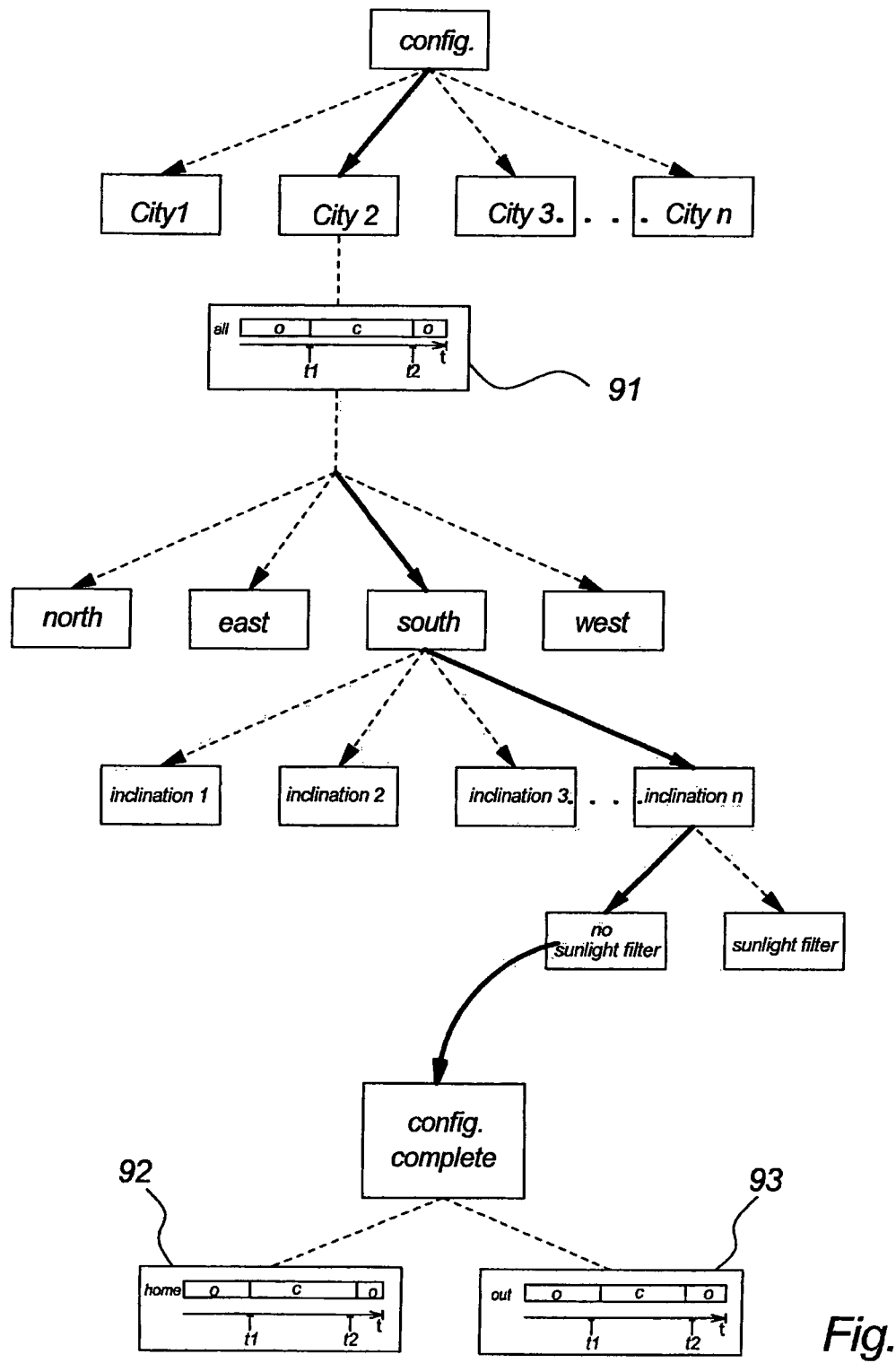
FIG. 11 illustrates an example of configuring the climate and comfort program according to some of the pre-setup possibilities.

FIG. 11 illustrates an example of a method of configuring the climate and comfort program according to some of the pre-setup possibilities.

The climate and comfort program may in accordance with an embodiment of the invention be configured manually by the user which may configure one screening device for a window in the house at the time or all simultaneously. Evidently, a specific configuration of one window will typically result in a more efficient control of the window. In practice, the user configuration is performed by the user by means of manually inputting information into the system about the screening device in question, e.g. by means of using the remote control as described with reference to FIG. 8.

The upper "configuration start" box illustrates that a user having a house with one or several building apertures has e.g. via a remote control unit chosen to make a configuration and thereby starting a climate and comfort program in accordance with an embodiment of the invention. The arrows marked with solid lines illustrate what the user chooses in this example.

The user now has to choose a nearby major city (e.g. Paris, Copenhagen or Firenze). In an embodiment of the invention the user gets some options in a list and may e.g. scroll in a menu to choose the nearest major city. Upon choosing the relevant major city is an option presented to the user to end the configuration process, thereby starting one climate and comfort program 91 controlling all controllable devices in the house. Alternatively, another place name may be chosen from a list, e.g. nearest well known attraction, e.g. Disney world—Florida, Legoland—Billund, Mount Everest, Himalaya The user may choose to go on to the more detailed configuration of one controllable device at the time. The user may firstly choose the direction of the device in question inputting the direction either north east south or west. In this example the user chooses south indicating that the device in question has a direction pointing south. Subsequently, the user may enter the relevant inclination of the window to which the controllable device is related. The inclination to be chosen may be chosen from a number of intervals, e.g. divided into inclination intervals of 5°. The user may finally choose if the window in question to which the controllable device is related comprises a sunlight filter or not.

Upon inputting information according to the above description, the configuration of the controllable device in question is now complete as illustrated with the box "config. complete". The system can now find the correct climate and comfort program according to the position, the direction, the inclination, the sunlight parameter and the home/out parameter. It should be noted that other information input made by the user or automatically retrieved via sensors or retrieved from external sources which may inflict on the climate and comfort program also is within the scope of the invention, e.g. information of building material, more precise location, the actual weather conditions, humidity sensor information, light sensor information etc. The user may subsequently configure another controllable device of the house.

Figure 12:
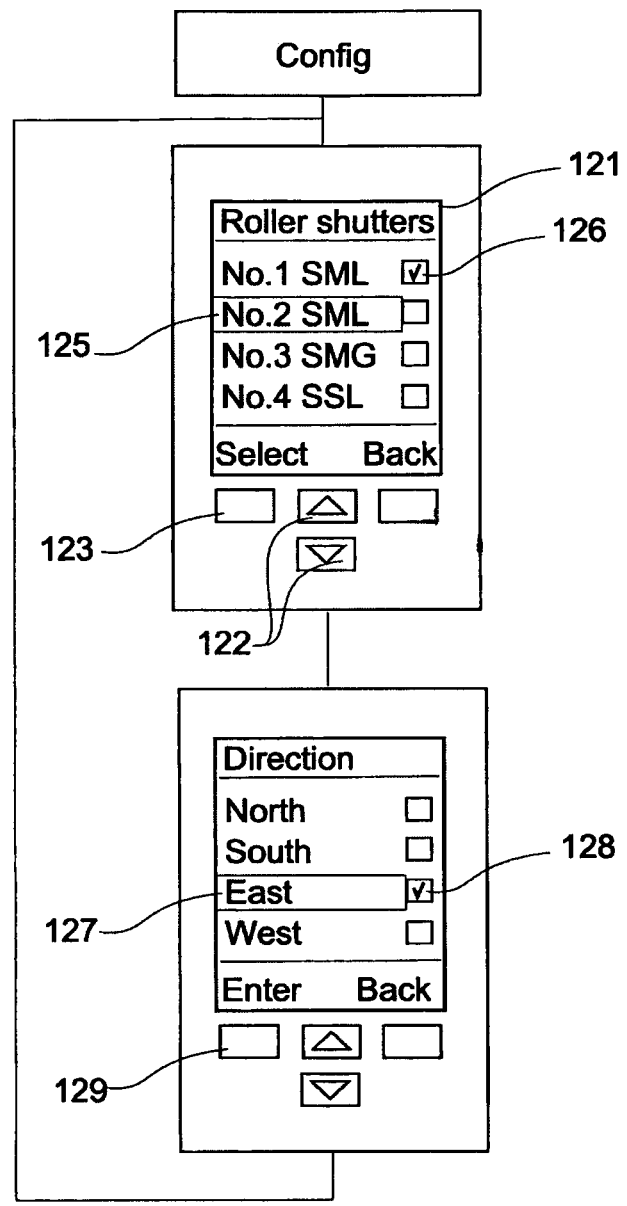
FIG. 12 illustrates an example of how screening devices may be configured according to direction.

FIG. 12 illustrates an example of the configuration of the direction. The controller/remote comprises a display (121). The display (121) shows a list of screening devices where screening device No. 2 is currently highlighted (125). The screening devices already configured comprise an indicator (126). The user may select the screening device in question by browsing with buttons (122) and for example select screening device No. 2 by pressing softbutton 123. Then a view is displayed where the user may assign direction to screening device No. 2 and for example select East (127) and press softbutton "enter" (129). The direction selection is shown by indicator (128). This way the user may configure and review the direction of each screening device.

When the climate and comfort program is running, the user may continuously choose between a setting of being home or out of the house by means of inputting this information into the system, e.g. via a remote control unit. This home/out parameter will entail the system to vary between two different climate and comfort programs 92, 93.

It should be noted that the climate and comfort programs 91, 92, 93 is understood as different variations of a climate and comfort programs in accordance with different embodiments of the invention.

It should be noted that the process described in the figures is only understood as an example of some information to be inputted by the user as well as the order of the information may be different from the illustrated.

The system will upon input of this information from the user be able to find the correct climate and comfort program and in that way find the correct time set point t1, t2 for shutters, curtains, blinds, venting valves etc. In practice, the system may utilize a database or simple table to store the climate and comfort programs or the relevant time stamps and corresponding actions. The system may then make queries in the database or table according to the input made by the user.

In accordance with an embodiment of the invention, the input from the user according to the above description may be automatically retrieved from electronic devices, e.g. sensors, GPS (General Positioning System), data retrieval from locally or remote databases, e.g. via the internet etc.

In an embodiment the invention provides, a method of controlling a controllable device related to a building aperture, whereby a climate related characteristic for said aperture is adjusted by said device, and whereby said device is controlled in accordance with a climate and comfort program which is dependent on at least one control parameter, said control parameter represents a geographical location and wherein said control parameter is indicated by means of user-input, whereby said device is controlled in accordance with a time schedule provided by said climate and comfort program.

In an embodiment the invention provides, a control system for controlling a controllable device related to a building aperture, the system comprising data processing means adapted to adjust a climate related characteristic for said aperture, wherein said device is controlled in accordance with a climate and comfort program executed by said data processing means which is dependent on at least one control parameter, said control parameter represents a geographical location and wherein said control parameter is indicated by means of user-input and wherein said device is controlled in accordance with a time schedule provided by said climate and comfort program.

In an embodiment the invention provides, a device for shading an opening related to a building aperture, comprising:
a climate and comfort controller configured to:
control open and close of shading means and operate by a time schedule provided by said climate and comfort controller to adjust a climate related characteristic, said climate and comfort controller is dependent on at least one control parameter related to a geographical location and wherein said control parameter is indicated by means of user-input.

In an embodiment of the invention there is provided, a method of controlling a controllable device related to shade means for a building aperture, whereby a climate related characteristic for said aperture is adjusted by said device, and whereby said device is controlled in accordance with a climate and comfort program which is dependent on at least one control parameter, said control parameters represents at least a geographical location and time and date, wherein said control parameter is indicated by means of user-input, whereby said device is controlled in accordance with a time schedule provided by said climate and comfort program wherein said time schedule is dependent on date related intervals/periods.

In an embodiment of the invention there is provided, a control system for controlling a controllable device related to shade means for a building aperture, the system comprising data processing means adapted to adjust a climate related characteristic for said aperture, wherein said device is controlled in accordance with a climate and comfort program executed by said data processing means which is dependent on at least one control parameter, said control parameters represents at least a geographical location and time and date and wherein said control parameter is indicated by means of user-input and wherein said device is controlled in accordance with a time schedule provided by said climate and comfort program wherein said time schedule is dependent on date related intervals/periods.

In an embodiment of the invention there is provided, a device for control of shade means of an opening related to a building aperture, comprising:
a climate and comfort controller configured to:
control open and close of shading means and operate by a time schedule provided by said climate and comfort controller to adjust a climate related characteristic, said climate and comfort controller is dependent on at least parameters related to a geographical location and time and date wherein said control parameter is indicated by means of user-input and wherein said time schedule is dependent on date related intervals/periods.

In an embodiment of the invention there is provided, a method of controlling a controllable device related to shade means for a building aperture, whereby a climate related characteristic for said aperture is adjusted by said device, and whereby said device is controlled in accordance with a climate and comfort program which is dependent on control parameters indicated by means of one of at least two user-input methods, a first user input method comprising control parameters representing a geographical location and time and date and a second user input method comprising at least an additional control parameter representing a direction of a window/roof light related to said controllable device, whereby said device is controlled in accordance with a time schedule provided by said climate and comfort program.

In an embodiment of the invention there is provided, a control system for controlling a controllable device related to shade means for a building aperture, the system comprising data processing means adapted to adjust a climate related characteristic for said aperture, wherein said device is controlled in accordance with a climate and comfort program executed by said data processing means which is dependent on control parameters indicated by means of one of at least two user-input methods comprising, a first user input method comprising control parameters representing a geographical location and time and date and a second user input method comprising at least an additional control parameter representing a direction of a window/roof light related to said controllable device, wherein said device is controlled in accordance with a time schedule provided by said climate and comfort program.

In an embodiment of the invention there is provided, a device for control of shade means of an opening related to a building aperture, comprising:
a climate and comfort controller configured to:
control open and close of shading means and operate by a time schedule provided by said climate and comfort controller to adjust a climate related characteristic, said climate and comfort controller is dependent on control parameters indicated by means of one of at least two user-input methods comprising, a first user input method comprising control parameters representing a geographical location and time and date and a second user input method comprising at least an additional control parameter representing a direction of a window/roof light related to said building aperture, wherein said shade means is controlled in accordance with a time schedule provided by said climate and comfort program.

The invention claimed is:
1. Method of controlling a controllable device related to a building aperture, including the following steps:
adjusting a climate related characteristic for said aperture with said device,
controlling said device in accordance with a climate and comfort program which is dependent on control parameters indicated by one of at least two user-input methods including a first user input method comprising control parameters representing a geographical location, a time, and a date and a second user input method comprising at least one control parameter representing a direction of a window or a roof light related to the controllable device;
providing a pre-defined time schedule with the climate and comfort program, and
controlling said device in accordance with the pre-defined time schedule.

2. Method according to claim 1, wherein said control parameter is configured for carrying out a user specified configuration of said climate and comfort program.

3. Method according to claim 1, wherein said climate and comfort program is sequentially organized, and wherein the sequence is dependent on different intervals or periods.

4. Method according to claim 3, wherein said different intervals or periods comprise weeks, months, or seasons.

5. Method according to claim 1, wherein said climate and comfort program operates dependent on a home or out parameter which indicates whether a user is inside the building or not.

6. Method according to claim 1, wherein said control parameter represents a geographical location selected from a list of nearest place names.

7. Method according to claim 6, wherein said list of the nearest place names comprises a list of nearest major cities.

8. Method according to claim 1, wherein said controllable device is a motor driven and accumulator powered screening device.

9. Method according to claim 8, wherein said powered screening device comprises a roller shutter or a blind.

10. Method according to claim 1, wherein said method of controlling may be performed parallel with a manual control by the user while said climate and comfort program is active.

11. Method according to claim 10, wherein said method of controlling is performed using a remote control.

12. Method according to claim 1, wherein at least two setup configurations are provided, wherein a first configuration provides indication of at least one basic control parameter and a second configuration provides indication of at least one additional control parameter different from said at least one basic control parameter.

13. Method according to claim 1, wherein the controllable device has plural positions including a mainly closed position which permits a smaller amount of sunlight to enter.

14. Method according to claim 1, wherein said control parameter represents an inclination of a window or sky light related to said controllable device.

15. Method according to claim 1, wherein said geographical location is determined by use of a global positioning system.

16. Method according to claim 1, wherein said control parameters represents at least a geographical location and time and date, wherein said control parameter is indicated by means of user-input, whereby said device is controlled in accordance with a time schedule provided by said climate and comfort program wherein said time schedule is dependent on date related intervals or periods.

17. Control system for controlling a controllable device related to a building aperture, the system comprising:
 data processing means adapted to adjust a climate related characteristic for said aperture,
 wherein said device is controlled in accordance with a climate and comfort program executed by said data processing means which is dependent on control parameters indicated by one of at least two user-input methods including a first user input method comprising control parameters representing a geographical location, a time, and a date and a second user input method comprising at least one control parameter representing a direction of a window or a roof light related to the controllable device; and
 wherein said device is controlled in accordance with a pre-defined time schedule provided by said climate and comfort program.

18. Control system according to claim 17, further comprising means for carrying out a user specified configuration of said climate and comfort program.

19. Control system according to claim 17, wherein said climate and comfort program operates differently according to different time intervals or periods.

20. Control system according to claim 19, wherein said different intervals or periods comprise weeks, months, or seasons.

21. Control system according to claim 17, wherein said climate and comfort program operates dependent on a home or out parameter which indicates whether a user is inside the building or not.

22. Control system according to claim 17, wherein said control parameter represents a geographical location selected from a list of nearest place names.

23. Control system according to claim 22, wherein said list of the nearest place names comprises a list of the nearest major cities.

24. Control system according to claim 17, further comprising a motor driven and accumulator powered screening device.

25. Control system according to claim 24, wherein said powered screening device comprises a roller shutter or a blind.

26. Control system according to claim 17, wherein said control system may be used parallel with a manual control by the user while said climate and comfort program is active.

27. Control system according to claim 26, wherein at least two setup configurations are provided, wherein a first configuration provides indication of at least one basic control parameter and a second configuration provides indication of at least one additional control parameter different from said at least one basic control parameter.

28. Control system according to claim 17, wherein the controllable device has plural positions including a mainly closed position which permits a smaller amount of sunlight to enter.

29. Control system according to claim 17, wherein said control system is used with a remote control.

30. Control system according to claim 17, wherein said control parameter represents an inclination of a window or sky light related to said controllable device.

31. Control system according to claim 17, wherein said geographical location is determined by use of a global positioning system.

32. Control system according to claim 17, wherein said control parameter represents at least a geographical location and time and date, wherein said control parameter is indicated by means of user-input, whereby said device is controlled in accordance with a time schedule provided by said climate and comfort program wherein said time schedule is dependent on date related intervals or periods.

33. Device for control of shade means of an opening related to a building aperture, comprising:
 a climate and comfort controller configured to:
 control open and close of shading means and operate by a pre-defined time schedule provided by said climate and comfort controller to adjust a climate related characteristic, said climate and comfort controller is dependent on control parameters indicated by one of at least two user-input methods including a first user input method comprising control parameters representing a geographical location, a time, and a date and a second user input method comprising at least one control parameter representing a direction of a window or a roof light related to the controllable device.

34. Device according to claim 33, wherein said control parameter comprises means for carrying out a user specified configuration of said climate and comfort program.

35. Device according to claim 33, wherein said climate and comfort controller is sequentially organized, and wherein the sequence is dependent on different intervals or periods.

36. Device according to claim 35, wherein said different intervals or periods comprise weeks, months, or seasons.

37. Device according to claim 33, wherein said climate and comfort controller operates dependent on a home or out parameter which indicates whether a user is inside the building or not.

38. Device according to claim 33, wherein said control parameter represents a geographical location selected from a list of nearest place names.

39. Device according to claim 38, wherein said list of the nearest place names comprises a list of the nearest major cities.

40. Device according to claim 33, wherein said control open and close of shading means may be performed parallel with a manual control by the user while said climate and comfort controller is active.

41. Device according to claim 33, wherein said device has drive means and accumulator means.

42. Device according to claim 33, wherein at least two setup configurations are provided, wherein a first configuration provides indication of at least one basic control parameter and a second configuration provides indication of at least one additional control parameter different from said at least one basic control parameter.

43. Device according to claim 33, wherein the shading means and/or controller has plural positions including a mainly closed position which permits a smaller amount of sunlight to enter.

44. Device according to claim 33, wherein said control open and close of shading means is performed using a remote control.

45. Device according to claim 33, wherein said control parameter represents the inclination of a window or sky light related to said controllable device.

46. Device according to claim 33, wherein control open and close of shading means and operate by a time schedule provided by said climate and comfort controller to adjust a climate related characteristic, said climate and comfort controller is dependent on at least parameters related to a geographical location and time and date wherein said control parameter is indicated by means of user-input and wherein said time schedule is dependent on date related intervals/periods.

* * * * *